United States Patent [19]

Cobb

[11] Patent Number: 5,860,157
[45] Date of Patent: Jan. 12, 1999

[54] NONVOLATILE MEMORY CARD CONTROLLER WITH AN OPTIMIZED MEMORY ADDRESS MAPPING WINDOW SCHEME

[75] Inventor: David M. Cobb, Carmichael, Calif.

[73] Assignee: Intel Corporation, Santa Clara, Calif.

[21] Appl. No.: 850,653

[22] Filed: May 2, 1997

Related U.S. Application Data

[63] Continuation of Ser. No. 187,745, Jan. 26, 1994, abandoned.

[51] Int. Cl.$^6$ ........................................................ G06F 12/02
[52] U.S. Cl. ............................ 711/103; 711/1; 711/4; 711/5; 711/115
[58] Field of Search .................................. 711/103, 5, 4, 711/1, 202, 200, 115

[56] References Cited

U.S. PATENT DOCUMENTS

| 5,200,959 | 4/1993 | Gross et al. | 371/21.6 |
| 5,535,357 | 7/1996 | Moran et al. | 711/103 |
| 5,671,368 | 9/1997 | Chan et al. | 395/282 |

FOREIGN PATENT DOCUMENTS

| 0392895A2 | 3/1990 | European Pat. Off. | G11C 16/06 |
| 0424191A1 | 9/1990 | European Pat. Off. | G11C 16/06 |
| 392895A2 | 10/1990 | European Pat. Off. | |
| 424191A2 | 4/1991 | European Pat. Off. | |

OTHER PUBLICATIONS

–Lou Hebert, "Flash Memory Cards," Intel Corporation Article Reprint, AR–700, pp. 4–312 through 4–315 (Mar./Apr. 1991).

–Intel Corporation, "Series 2 Flash Memory Cards iMC004FLSA, iMC010FLSA, iMC020FLSA," Intel Corporation Memory Products Handbook 1993, pp. 4–91 (Oct. 1992).

–Intel Corporation, "PC Card Interface Controller (PCIC)," Intel Corporation Mobile Computer Products Handbook 1993, pp. 3–124 through 3–177 (Nov. 1992).

Intel Corp., "PC Card Interface Controller(PCIP)," Intel corp. Mobile Computer Products Handbook, 1993.

(List continued on next page.)

Primary Examiner—Eddie P. Chan
Assistant Examiner—T. V. Nguyen
Attorney, Agent, or Firm—Blakely, Sokoloff, Taylor & Zafman LLP

[57] ABSTRACT

A method of locating a memory address of a nonvolatile memory card that corresponds to an external address in an integrated circuit card controller that controls memory operation of the card is described. The controller includes a first memory address mapping window and a second memory address mapping window, each storing one of a first and a second set of memory addresses of the nonvolatile memory card. The method includes the steps of accessing the first window for the memory address associated with the external address when external circuitry accesses the nonvolatile memory card with the external address. If the first window has the memory address, then the first window is accessed for the memory address. If the first window does not have the memory address, then the second window is accessed for the memory address. If the second window does not have the memory address, then the second window is updated with a third set of memory addresses of the nonvolatile memory card. The second window is then switched with the first window such that the second window becomes the first window and the first window becomes the second window. If the second window has the memory address, then the second window is simply switched with the first window such that the second window becomes the first window and the first window becomes the second window. The new first window is then accessed for the memory address. In this way, updates of the first and second windows are minimized.

14 Claims, 7 Drawing Sheets

OTHER PUBLICATIONS

Lou Hebert, "Flash Memory Cards," Intel Corp. Article Reprint, AR–700, 1991.
–Markus A. Levy et al., "Solutions for High Density Applications Using Intel Flash Memory," Intel Corporation Application Note, AP–343, pp. 6–297 through 6–335 (Oct. 1990).

–Markus Levy, "Interfacing Microsoft's Flash File System," Intel Corporation Article Reprint, AR–702, pp. 4–318 through 4–330 (Jun./Jul. 1991).

–Don Verner, "Execute–In–Place," Intel Corporation Article Reprint, AR–701, pp. 4–316 through 4–317 (Mar./ Apr. 1991).

NONVOLATILE MEMORY CARD CONTROLLER WITH AN OPTIMIZED MEMORY ADDRESS MAPPING WINDOW SCHEME

This is a continuation of application Ser. No. 08/187,745, filed Jan. 26, 1994, now abandoned.

FIELD OF THE INVENTION

The present invention pertains to the field of computer memories. More particularly, this invention relates to a nonvolatile memory card controller in a computer system with an optimized memory address mapping window scheme such that the number of memory address mapping window update operations in the nonvolatile memory card controller is substantially reduced and the system performance of the computer system is improved.

BACKGROUND OF THE INVENTION

One type of prior nonvolatile memory is the flash erasable and electrically programmable read-only memory ("Flash EPROM"). The flash EPROM can be programmed by a user. Once programmed, the entire contents of the flash EPROM can be electrically erased. The flash EPROM may then be reprogrammed with new data.

Prior art personal computer systems typically employ removable data storage media. One common prior art removable storage medium is a floppy disk. A relatively new prior art storage medium is an integrated circuit-based memory card ("IC memory card").

Prior art flash EPROMs are nonvolatile and reprogrammable, and this has permitted the flash EPROM technology to be used for removable data storage. One such prior art application is the flash EPROM memory card ("flash memory card"). The flash memory card typically includes a number of flash EPROMs. The flash memory card can be erased and programmed electrically.

A prior art computer system that can receive a flash memory card typically includes an integrated circuit ("IC") card interface controller. The IC card controller is typically used in the prior art computer system to interface with the flash memory card. In addition, the IC card interface controller can also interface with other types of IC cards, such as a modem card and a LAN ("Local Area Network") card. When a flash memory card is connected to the prior art computer system, the IC card interface controller receives addresses, data, control signals, power, and ground from the computer system. The IC card interface controller in turn controls operations of the flash memory card.

Disadvantages are, however, associated with the prior IC card interface controller. One disadvantage associated is that the IC card interface controller cannot address all of the address locations of the flash memory card at any given time. Instead, the 16 card interface controller is only allowed to access a section (i.e., block) of the entire memory space of the flash memory card at any given time. The addresses of that section of the memory space of the flash memory card are maintained in a memory address mapping window in the IC card interface controller.

When a circuit of the computer system accesses the flash memory card with an address, the IC card interface controller first accesses the window to see if the address is within the window. If the window contains that address, it means that the current access to the flash memory card is to the section and the flash memory card can then be accessed. If the window does not contain that address, it means that a different section of the flash memory card is addressed and the window needs to be updated with the addresses of that different section of the flash memory card. In order to update the window with the addresses of that different section, many layers of software running on the computer system need to be invoked. This typically causes the update of the window to be relatively time consuming that in turn affects the speed of accessing the flash memory card.

Another disadvantage is that the window typically needs to be repeatedly updated during a read or write operation of the flash memory card. As is known, in a prior flash memory card, a block allocation structure is located in a bottom area of the card and a file control structure is located in a top area of the memory space of the card. During an access to the flash memory card, the two structures need to be accessed many times before a section of the flash memory card is actually accessed. This typically causes the window in the IC card interface controller to be repeatedly changed, which takes a significant amount of time and results in a performance penalty.

SUMMARY AND OBJECTS OF THE INVENTION

One of the objects of the present invention is to improve system performance of a computer system having a nonvolatile memory card.

Another object of the present invention is to reduce the overall system overhead of a computer system which has a nonvolatile memory card.

Another object of the present invention is to reduce the time required to access different memory locations in a nonvolatile memory card of a computer system.

Another object of the present invention is to provide an optimized arrangement for accessing different memory locations in a nonvolatile memory card of a computer system such that the system performance of the computer system is improved.

A further object of the present invention is to provide an optimized arrangement for accessing different memory locations in a nonvolatile memory card of a computer system by maintaining multiple memory address mapping windows active such that the access time to the nonvolatile memory card is substantially reduced and the system performance is maximized.

A method of locating a memory address of a nonvolatile memory card that corresponds to an external address in an integrated circuit card controller that controls memory operations of the card is described. The controller includes a first memory address mapping window and a second memory address mapping window, each storing one of a first and a second set of memory addresses of the nonvolatile memory card. The method includes the steps of accessing the first window for the memory address associated with the external address when external circuitry accesses the nonvolatile memory card with the external address. If the first window has the memory address, then the first window is accessed for the memory address. If the first window does not have the memory address, then the second window is accessed for the memory address. If the second window does not have the memory address, then the second window is updated with a third set of memory addresses of the nonvolatile memory card. The second window is then switched with the first window such that the second window becomes the first window and the first window becomes the second window. If the second window has the memory address, then the second window is simply switched with the first window such that the second window becomes the first window and the first window becomes the second window. The new first window is then accessed for the memory address. In this way, updates of the first and second windows are minimized.

A computer system includes a bus, a central processing unit coupled to the bus, and an integrated circuit card controller coupled to the bus for controlling memory operation of a nonvolatile memory card coupled to the controller. The controller further includes a first memory address mapping window for storing a first set of memory addresses of the memory card and a second memory address mapping window for storing a second set of memory addresses of the memory card. Both the first and second windows are readily accessible. Circuitry is provided for locating a memory address of the memory card that corresponds to an external address by accessing the first and second windows. The circuitry for locating accesses the first window for the memory address when external circuitry accesses the memory card with the external address. If the first window does not have the memory address, then the circuitry for locating accesses the second window for the memory address. Circuitry is provided for updating the second window with a third set of memory addresses of the memory card if the second window does not have the memory address. Circuitry is provided for switching the second window with the first window if the first window does not have the memory address such that the second window becomes the first window and the first window becomes the second window. In this way, updates of the first and second windows are minimized.

Other objects, features, and advantages of the present invention will be apparent from the accompanying drawings and from the detailed description that follows below.

BRIEF DESCRIPTION OF THE DRAWINGS

The present invention is illustrated by way of example and not limited to the figures of the accompanying drawings, in which like references indicate similar elements and in which.

DETAILED DESCRIPTION

Figure 1:
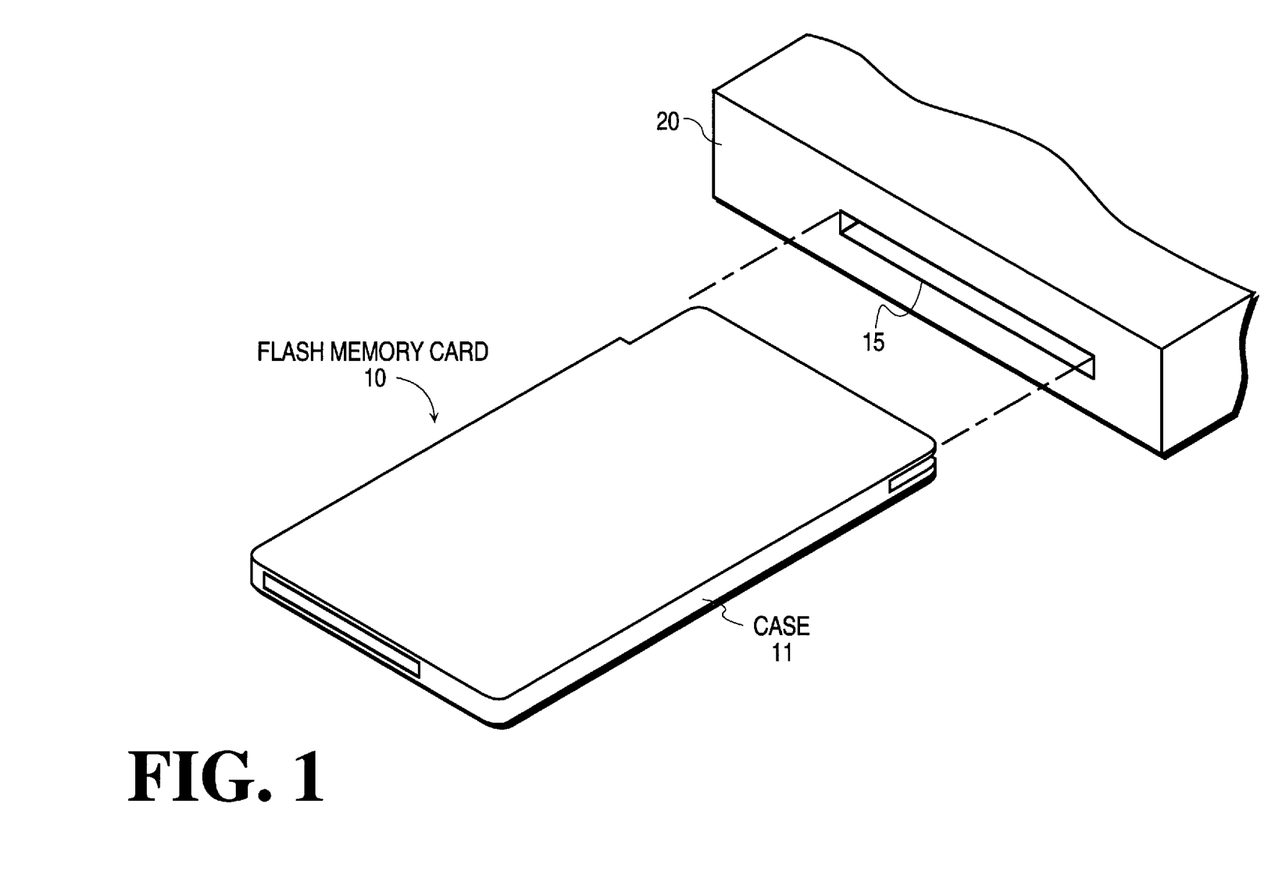
FIG. 1 is a perspective view of a portion of a computer system and a flash memory card to be inserted in the computer system.

FIG. 1 is a perspective view of a flash memory card 10. Inside case 11 of flash memory card 10, there are a plurality of flash EPROMs (not shown in FIG. 1) for storing data at addresses. Flash memory card 10 is inserted into a slot of opening 15 of a computer system 20 for a memory read or write operation. The architecture of computer system 20 is shown in block diagram in FIG. 2, which will be described in more detail below.

Figure 2:
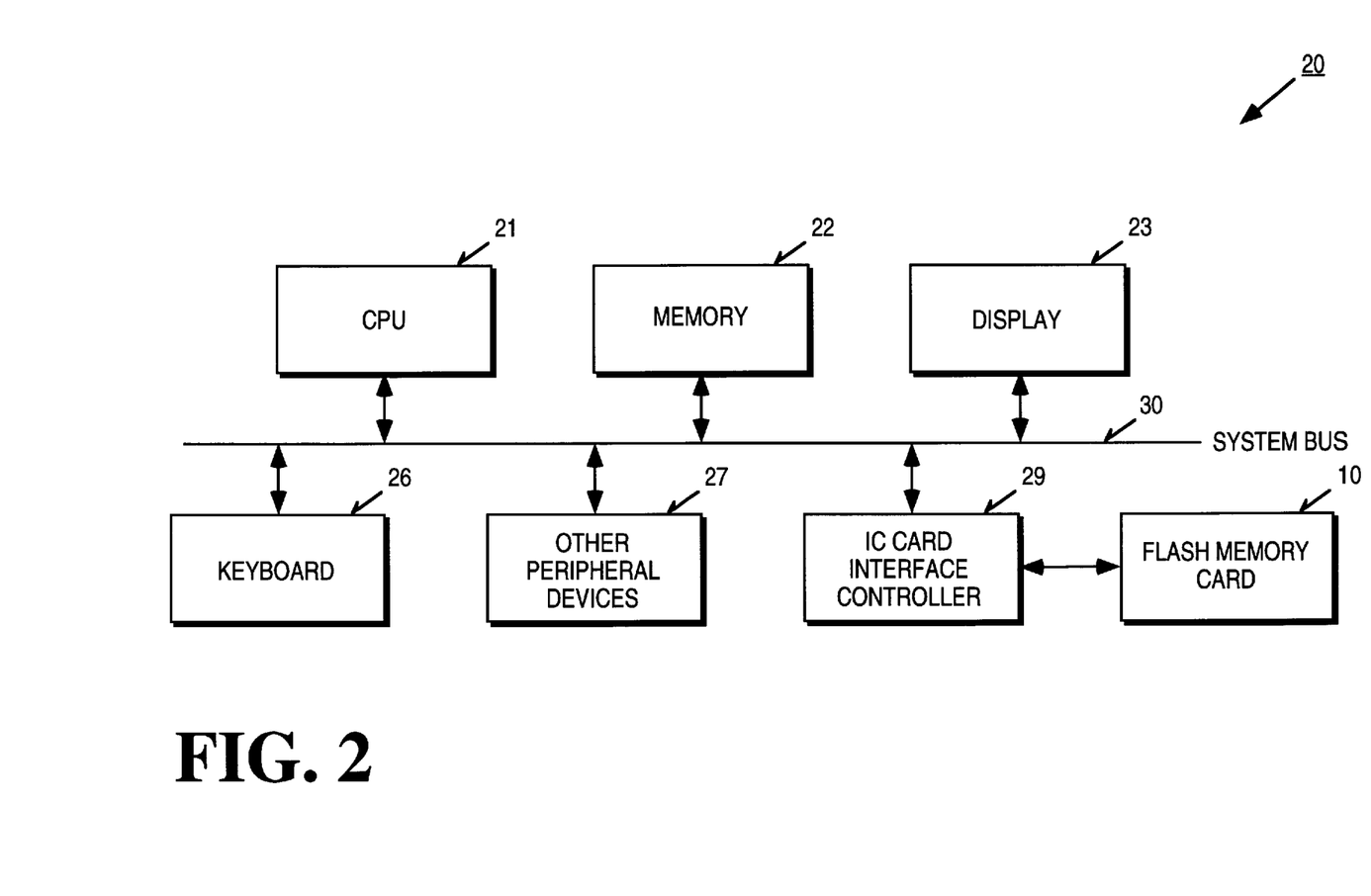
FIG. 2 is a block diagram of the computer system of FIG. 1 when the flash memory card is inserted into the computer system, wherein the computer system includes an IC card interface controller for interfacing with the flash memory card.

FIG. 2 illustrates the architecture of computer system 20 which includes an IC card interface controller 29 for interfacing with flash memory card 10 and which implements an embodiment of the present invention.

A method is described for locating a memory address of flash memory card 10 that corresponds to an external address in IC card interface controller 29. IC card interface controller 29 supports a first memory address mapping window and a second memory address mapping window, each storing one of a first and a second set of memory addresses of flash memory card 10. The first window is first accessed for the memory address. If the first window has the memory address, then the first window remains the first window and the memory address is obtained. If the first window does not have the memory address, then the second window is accessed. If the second window has the memory address, the second window is then promoted to be the first window and the first window is demoted to be the second window. If the second window does not have the memory address, the second window is updated with new memory address mapping information and then promoted to be the first window. The new first window is then accessed for the memory address. In this way, updates of the first and second memory address mapping windows are minimized and system performance of computer system 20 is increased.

Referring to FIG. 2, computer system 20, for one embodiment, is a personal computer system. For a further embodiment, computer system 20 is a laptop or notebook computer system. For alternative embodiments, computer system 20 comprises a portable computer, a workstation, a minicomputer, a mainframe, or any other type of computer.

Computer system 20 includes a central processing unit ("CPU") 21. For one embodiment, CPU 21 comprises a microprocessor manufactured and sold by Intel Corporation of Santa Clara, Calif.

CPU 21 is coupled to a system bus 30 of computer system 20. System bus 30 is used in computer system 20 as the backplane bus for transfer of data among various components of computer system 20.

Computer system 20 includes memory 22 accessed by CPU 21 via system bus 30. Memory 22 stores programs and data that are needed for the operation of computer system 20. Memory 22 may include random access memories ("RAMs"), read only memories ("ROMs"), EPROMs, flash EPROMs, and other types of memories.

Computer system 20 also includes a keyboard 26 and a display 23 coupled to system bus 30. Computer system 20 also includes other peripheral devices 27 that are connected to system bus 30. These other peripheral devices may include a floppy disk drive, a hard disk drive, a modem, a serial communication controller, a local area network ("LAN"), and a parallel communication controller.

Computer system 20 further includes IC card interface controller 29. IC card interface controller 29 is also coupled to system bus 30. As can be seen from FIG. 2, IC card interface controller 29 interfaces with flash memory card 10 when flash memory card 10 is inserted into slot 15 (FIG. 1) of computer system 20. IC card interface controller 29 is the interface of flash memory card 10 with components 21 through 27 of computer system 20. IC card interface controller 29 is used in computer system 20 to control operations of flash memory card 10. IC card interface controller 29 receives data, addresses, and control information from one of components 21 through 27 of computer system 20 that is accessing flash memory card 10. IC card interface controller 29 in turn controls the access to flash memory card 10 based on the data, addresses, and control information received. The architecture of IC card interface controller 29 will be described in more detail below, in conjunction with FIG. 3.

IC card interface controller 29 can also interface with other types of integrated circuit cards. For example, a modem card can be connected with IC card interface controller 29 in addition to or instead of the connection of flash memory card 10 to controller 29. As a further example, IC card interface controller 29 can be connected to a LAN card or a cellular phone card.

For one embodiment, IC card interface controller 29 can be connected to one integrated circuit card at any given time. For another embodiment, IC card interface controller 29 can be connected to two or more integrated circuit cards at any given time.

Figure 3:
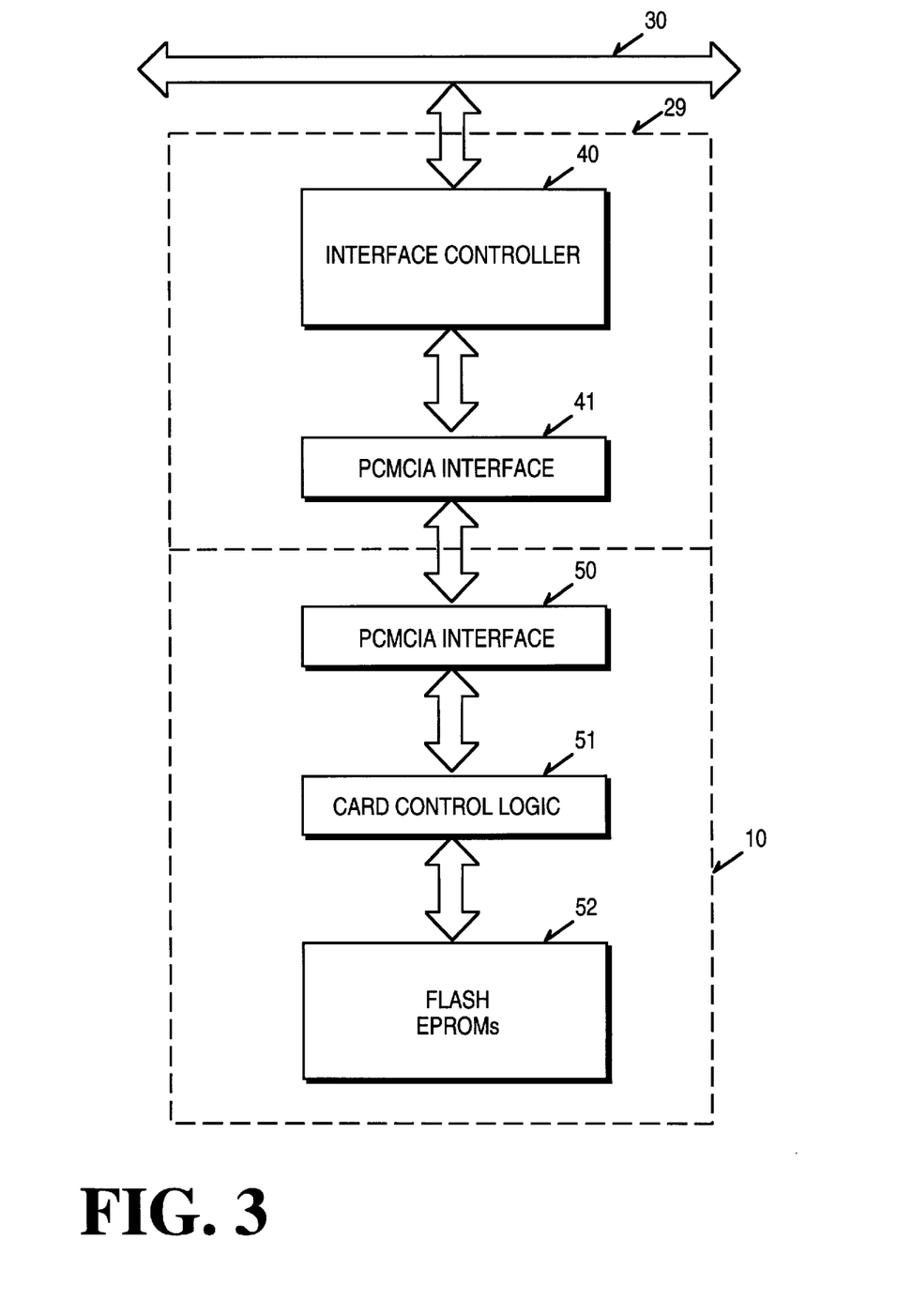
FIG. 3 is a block diagram of the IC card interface controller of FIG. 2 connected with the flash memory card.

Referring to FIG. 3, the structure of IC card interface controller 29 is shown in block diagram form. In addition, the structure of flash memory card 10 that is connected to IC card interface controller 29 is also shown in block diagram form in FIG. 3. As can be seen from FIG. 3, flash memory card 10 includes a memory array 52 that includes a number of flash EPROMs. For one embodiment, memory array 52 of flash memory card 10 includes twenty flash EPROMs, each storing sixteen megabits ("Mbits") of data. This allows flash memory card 10 to store forty megabytes of data. For another embodiment, memory array 52 of flash memory card 10 includes thirty-two flash EPROMs, each storing sixteen Mbits of data. This allows flash memory card 10 to store sixty-four megabytes of data.

Memory array 52 of flash memory card 10 is coupled to a card control logic 51. Card control logic 51 interfaces between a PCMCIA ("Personal Computer Memory Card International Association") interface 50 of flash memory card 10 and memory array 52. PCMCIA interface 50 of flash memory card 10 is the interface of flash memory card 10 that electrically connects flash memory card 10 to IC card interface controller 29.

Card control logic 51 provides control logic for flash memory card 10. Card control logic 51 also includes an attribute memory plane (not shown) that includes a card information structure (not shown) and registers (also not shown). The registers of the attribute memory plane of card control logic 51 are used to provide control and report status with respect to flash memory card 10. The card information structure of the attribute memory plane of flash memory card 10 contains data describing the structure of flash memory card 10. The circuitry of computer system 20 which is external to flash memory card 10 can access the attribute memory plane of card control logic 51 for the information stored in the registers and in the card information structure.

Card control logic 51 receives addresses, data, and control signals from IC card interface controller 29 via PCMCIA interface 50. Card control logic 51 then (1) oversees reading, erasing, and programming with respect to memory array 52, (2) oversees the use of the electrical power within flash memory card 10, and (3) oversees sending out the card information structure data and status data with respect to flash memory card 10.

PCMCIA interface 50 of flash memory card 10 includes a sixty-eight pin socket (not shown) that is connected with a corresponding PCMCIA interface 41 of IC card interface controller 29 when flash memory card 10 is inserted into slot 15 (FIG. 1) of computer system 20. The sixty eight pin socket of PCMCIA interface 50 of flash memory card 10 includes sixty signal pins and eight power connections.

IC card interface controller 29 includes an interface controller 40 and PCMCIA interface 41. Interface controller 40 is connected to system bus 30 of computer system 20. Interface controller 40 is also connected to PCMCIA interface 41 of IC card interface controller 29. As described above, PCMCIA interface 41 of IC card interface controller 29 is connected to PCMCIA interface 50 of flash memory card 10 when flash memory card 10 is inserted into slot 15 (FIG. 1) of computer system 20.

Interface controller 40 of IC card interface controller 29 includes a bus interface (not shown) that interfaces interface controller 40 with system bus 30. Interface controller 40 also includes logic (not shown) for providing memory paging and memory address mapping for both (1) memory array 52 and (2) the attribute memory plane of flash memory card 10, and for providing I/O address mapping. Interface controller 40 includes registers to allow access to the card information structure and the registers within the attribute memory plane of card control logic 51 of flash memory card 10. The logic in interface controller 40 for providing memory address mapping includes a number of independently enabled and controlled system memory address mapping windows, each of which maps a portion of the memory space of memory array 52 of flash memory card 10 into the system address space of computer system 20 at any given time. Each memory window only maps a portion of the entire memory address space of memory array 52 into the system address space at any given time. This allows for minimized hardware in interface controller 40 to map the memory address space of memory array 52 into the system address space of computer system 20. This also allows fast address mapping operation for access to memory array 52 of flash memory card 10.

A memory window of interface controller 40 may directly map a portion of the memory address space of memory array 52 into the system address space (i.e., no address translation is performed on the external address generated by the circuitry of computer system 20 that is accessing flash memory card 10) or translates the external address into the corresponding memory address of flash memory card 10.

For one embodiment, interface controller 40 supports two memory address mapping windows. For another embodiment, interface controller 40 supports five independently enabled and controlled memory address mapping windows. For alternative embodiments, interface controller 40 can support more or fewer than five memory address mapping windows. Each memory address mapping window of interface controller 40 maps into either memory array 52 of flash memory card 10 or the attribute memory plane of card control logic 51 of flash memory card 10. Each memory address mapping window of interface controller 40 maps a different section of the memory address space of either memory array 52 or the attribute memory plane of flash memory card 10.

Mapping of each memory address mapping window can start and stop on any four kilobyte ("Kbyte") boundary of the system address space that is beyond the initial sixty-four Kbyte system address space. Interface controller 40 does not allow mapping of a memory window between zero and sixty-four Kbyte address locations in the system address space. Only I/O address mapping windows in interface controller 40 are allowed to be mapped into that region.

For one embodiment, each memory window contains the addresses of a four Kbyte memory space of memory array 52. For alternative embodiments, each memory window may contain the addresses of a memory section of memory array 52 that is larger or smaller than four Kbytes.

Memory array 52 of flash memory card 10 can be accessed through any of the memory windows in interface controller 40 of IC card interface controller 29. The memory windows in interface controller 40 can be configured by a flash memory card software. Multiple memory windows that map into separate sections of memory array 52 of flash memory card 10 can be opened simultaneously by the flash memory card software. The flash memory card software that configures and updates the memory windows will be described in more detail below, in conjunction with FIG. 4.

To open a memory window, a system memory start address, a system memory stop address, and a flash memory card offset address are set, under the control of the flash memory card software, in the registers of interface controller 40 of IC card interface controller 29. The flash memory card offset address is added to the system memory address that is to address flash memory card 10 to generate the actual memory address for flash memory card 10. The flash memory card offset address is set by the flash memory card software to be equal to the 2's complement of the difference between the system memory start address and the start address of the corresponding section of memory array 52 of flash memory card 10. If the system memory start address is equal to the start address of the corresponding section of memory array 52, than the flash memory card offset address is equal to zero, in which case no address translation is required.

Flash memory card 10 is accessed when (1) a memory window is enabled; (2) the system memory address that addresses flash memory card 10 is greater than or equal to the system memory start address of the enabled memory window; and (3) the system memory address that addresses flash memory card 10 is less than or equal to the system memory stop address of the enabled memory window. When any one of the above-mentioned conditions is not satisfied—which means that the system memory address is not within the enabled memory window—a different memory window is enabled to determine if the system memory address can be found within the range of that different memory window. If the system memory address cannot be found within any of the memory windows within interface controller 40, then the flash memory card software updates the currently active memory window within interface controller 40 with the addresses of a new section of memory array 52 of flash memory card 10. The memory window update process in accordance with an embodiment of the present invention will be described in more detail below, in conjunction with FIGS. 5–7. The flash memory card software will also be described in more detail below, in conjunction with FIG. 4.

Figure 4:
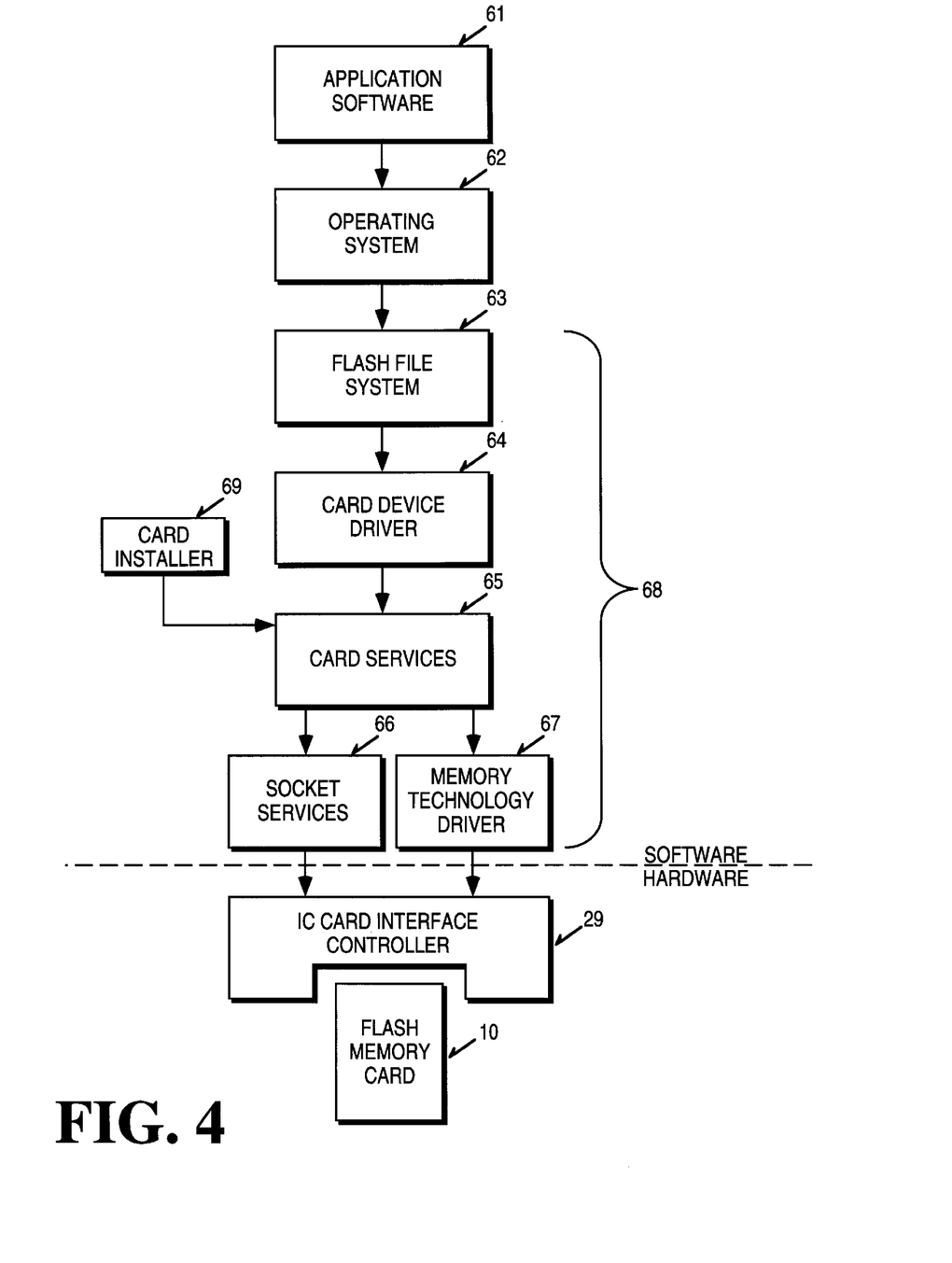
FIG. 4 is a block diagram of different levels of a flash memory card software that operate with respect to the IC card interface controller of FIGS. 2–3.

Referring to FIG. 4, the flash memory card software 68 that operates in computer system 20 of FIG. 2 with respect to IC card interface controller 29 is shown in block diagram form. Flash memory card software 68 includes many layers of software. As can be seen from FIG. 4, flash memory card software 68 includes a flash file system 63 which is the first layer of flash memory card software 68. Flash file system 63 is the file system dedicated to flash memory media. Flash file system 63 is interfaced with an operation system 62 of computer system 20 (FIG. 2). Operating system 62 processes commands, controls program execution, which includes the execution of flash file system 63, and oversees the hardware and software resources of computer system 20.

Flash file system 63 provides the link between operating systems 62 and flash memory card 10 and its hardware and software drivers.

Flash file system 63 is a data file management software that provides data file storage and memory management for flash memory card 10. Flash file system 63 changes the file system commands of operating system 62 into a form understood by flash memory card 10 and its related software drivers. Alternatively, flash file system 63 can be combined with operating system 62 to become a flash operating system.

Flash memory card software 68 also includes a card device driver 64 that interfaces with flash file system 63. Card device driver 64 is sold by Intel Corporation of Santa Clara, Calif. Card device driver 64 is then interfaced with a card services software 65. Card services software 65 then interfaces with socket services 66 and a memory technology driver 67. Socket services 66 and memory technology driver 67 then interface with the hardware of IC card interface controller 29. Memory technology driver 67 isolates card specific software and provides the algorithms necessary to manipulate flash memory card 10. Card services software 65 also interfaces with a card installer utility 69, as can be seen from FIG. 4.

Card device driver 64, card services 65, socket services 66, and memory technology driver 67 are low level drivers of flash memory card software 68 that depend on the architecture of IC card interface controller 29. In this respect, flash file system 63 is the high level driver of operating system 62 that communicates with the low level drivers of software 68. Flash file system 63 develops and maintains a linked list structure with respect to file and directory entries of the files and directories to be stored in flash memory card 10. Flash file system 63 provides the link between operating system 62 and flash memory card 10 and its related software and hardware device drivers, such as card device driver 64, card services 65, socket services 66, and memory technology driver 67.

Card services software 65 is the central piece of software in flash memory card software 68 that implements the PCMCIA standard protocol. Card services 65 and socket services 66 are supplied by BIOS ("Basic Input Output System") vendors such as Award Software International Inc. of Los Gatos, Calif. Memory technology driver 67 is supplied by Intel Corporation of Santa Clara, Calif.

All the software pieces 63–67 of flash memory card software 68 can be loaded from a piece of software which is referred to as a configuration driver. Memory technology driver 67 can also be loaded from commands of operating system 62. Card services 65 can also be installed by card installer 69 that simplifies the installation of the PCMCIA software. Intel Corporation of Santa Clara, Calif. supplies card installer 69 which executes from the prompt of operating system 62.

As described above in connection with FIG. 3, IC card interface controller 29 includes a number of memory address mapping windows for mapping the system memory addresses into the memory addresses of memory array 52 (FIG. 3) of flash memory card 10. The memory windows are configured and updated by flash memory card software 68 of FIG. 4. The process of updating a memory window is shown in FIG. 6, which will be described in more detail below.

Figure 5:
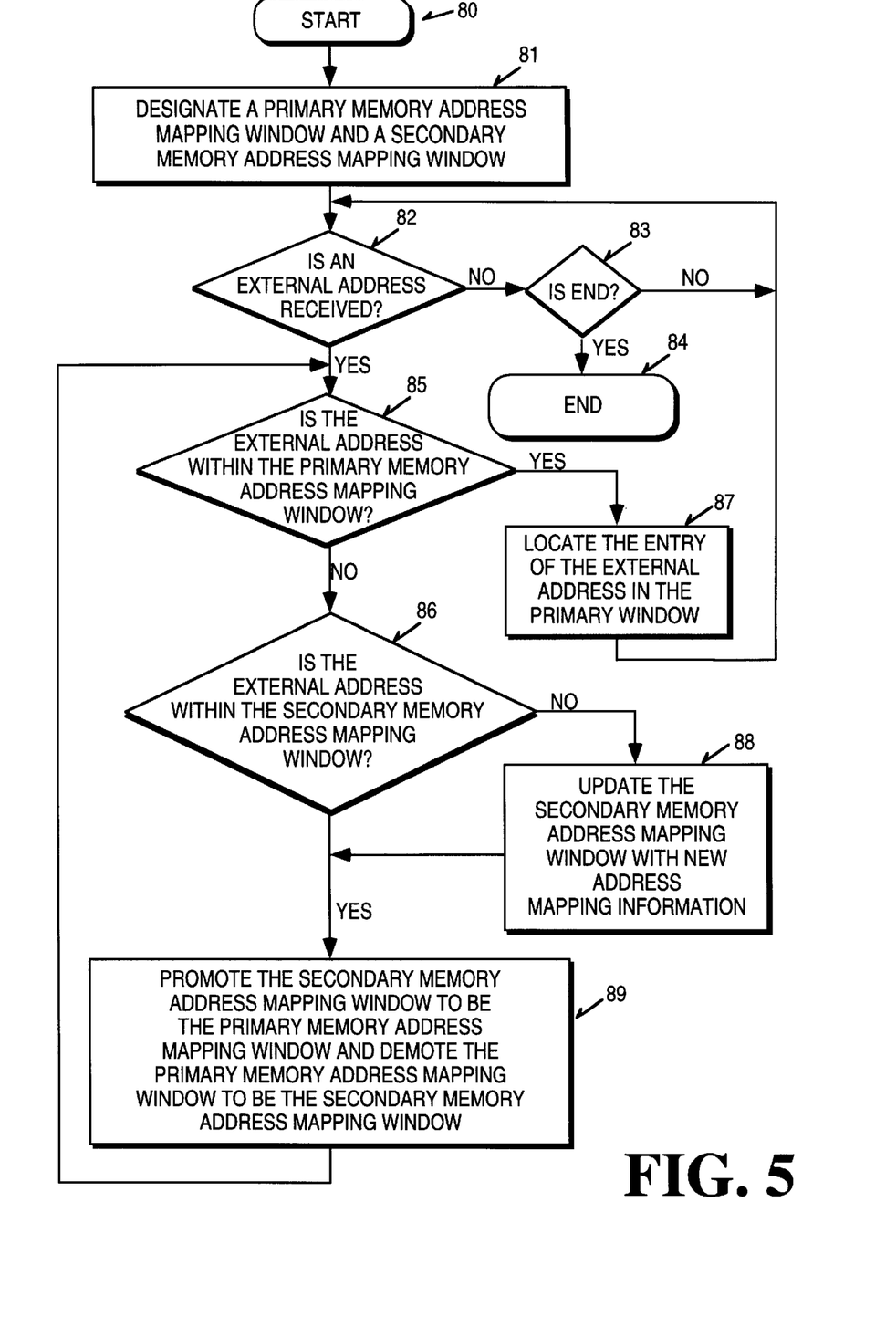
FIG. 5 is a flow chart of the process of accessing a first and a second memory address mapping window in the IC card interface controller in accordance with an embodiment of the present invention.
Figure 6:
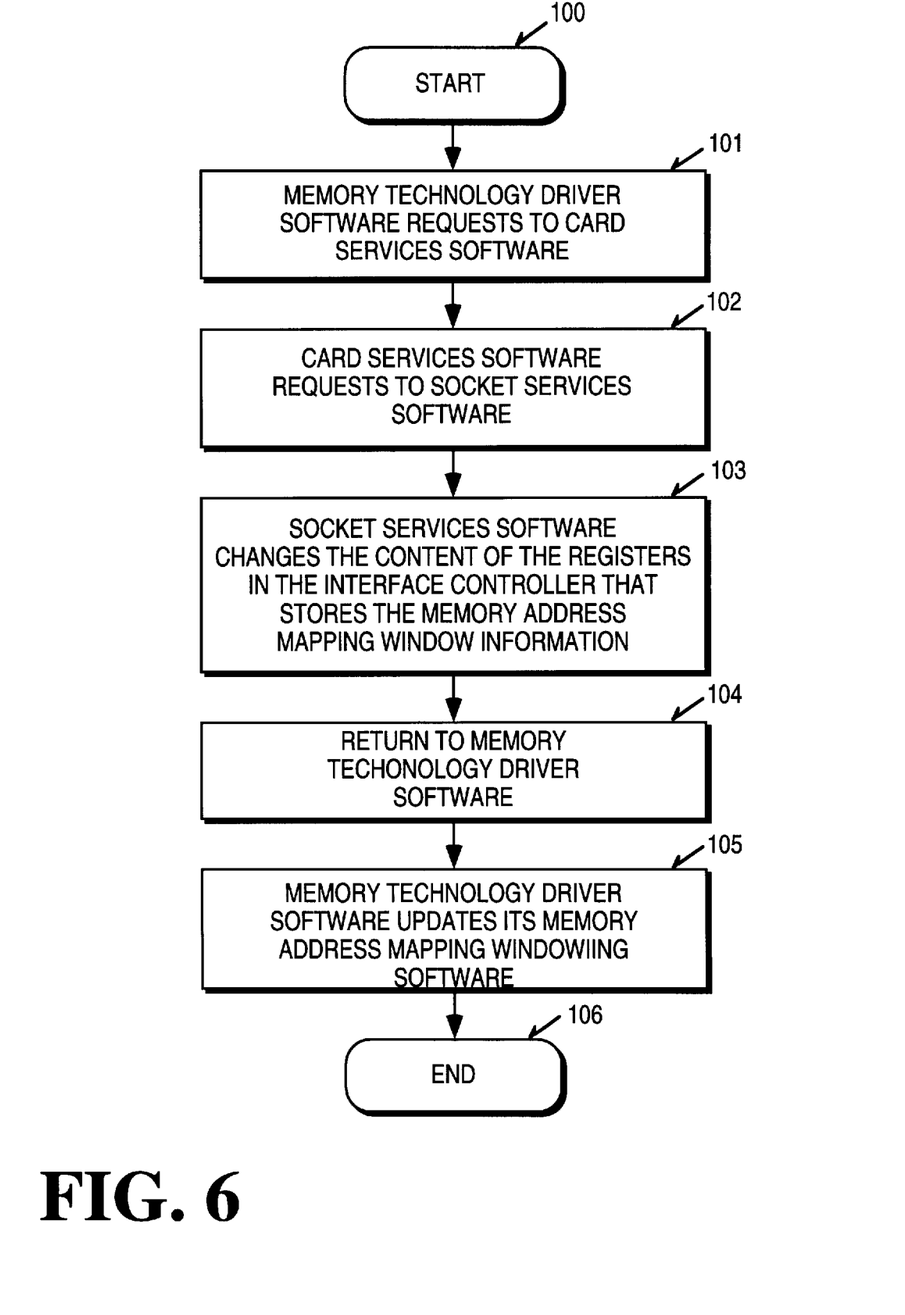
FIG. 6 is a flow chart of the process of updating one of the first and second memory address mapping windows in the IC card interface controller.

Referring to FIG. 6, the process starts at step 100. At step 101, memory technology driver 67 (FIG. 4) makes a request to card services 65 when memory technology driver 67 determines that the currently active memory window within IC card interface controller 29 needs to be updated. Memory technology driver 67 operates with respect to flash memory card 10 via IC card interface controller 29 during the access to flash memory card 10. Socket services software 66 (FIG. 4) is used to configure the hardware of IC interface controller 29 (FIG. 4). Therefore, when memory technology driver 67 determines that the memory window in IC card interface controller 29 needs to be updated at step 101, memory technology driver 67 has to make a request to card services 65. This causes a new software layer (i.e., card services 65) to be invoked. At step 102, card services 65 makes a request to socket services 66 to update the memory window. This also causes a new software layer to be invoked. At step 103, socket services 66 updates the memory window in IC card interface controller 29 (FIG. 4). Socket services 66 does this by changing the contents of the corresponding registers in IC card interface controller 29 that store the memory window information. The actual input/output instructions in socket services 66 change the contents of these registers in IC card interface controller 29. At step 104, the process then returns to memory technology driver 67 via card services 65. At step 105, memory technology driver 67 updates its windowing software. The memory window update process is then ended at step 106. As can be seen from FIG. 6, the memory widow update process takes relatively long to complete and involves many layers of software. Thus, it is desirable to minimize the number of times for updating the memory windows. FIG. 5 shows the process that minimizes the times the memory window update process is performed, which implements an embodiment of the present invention. The process shown in FIG. 5 will be described in more detail below.

The process shown in FIG. 5 is implemented in memory technology driver 67 (FIG. 4). The implementation of the process of FIG. 5 improves the performance of IC card interface controller 29 (FIGS. 2–4). It also optimizes controller 29. In addition, it improves the performance of flash memory card software 68 (FIG. 4). It reduces the time of accessing flash memory card 10 via flash memory card software 68. Overall system overhead is reduced by the implementation of the process of FIG. 5 in memory technology driver 67.

The process of FIG. 5 employs at least two memory windows in IC card interface controller 29 for accessing flash memory card 10. One of the two windows (i.e., the primary window) is first accessed when a system memory address is to access flash memory card 10. If the system memory address is not found within the primary window, then the other window (i.e., secondary window) is accessed. If the secondary window does not include the external address, then the secondary window is updated by the process described above in connection with FIG. 6. The priorities of the primary and secondary windows are then reversed. In other words, the secondary window is promoted, and becomes the primary window. The primary window is demoted, and becomes the secondary window. The new primary window is then accessed to determine if the system memory address is within the new primary window. If the secondary window includes the external address, then the priorities of the primary and secondary windows are reversed without first updating the secondary window. In other words, the secondary window is promoted, and becomes the primary window. The primary window is demoted, and becomes the secondary window. The new primary window will then be accessed first when a next system memory address is received. By doing so, updates of the memory windows are reduced.

Referring now to FIG. 5, the process of minimizing the memory window update operation in accordance with one embodiment of the present invention starts at step 80. At step 81, a primary memory window and a secondary memory window are designated. At step 82, a judgment is rendered to determine if an external system memory address is received. If the answer is no, then step 83 is executed. If the answer is yes, step 85 is then performed.

Step 83 is another judgment step at which a judgment is made to determine if the process is to end or not. If the answer is yes, then the process ends at step 84. If the answer is no, then the process returns to step 82.

Likewise, step 85 is a judgment step for determining whether the external address is within the primary window. If the external address is found to be within the primary window at step 85, then step 87 is executed at which the entry of the external address in the primary window is located. The process then returns to step 82.

If, at step 85, the external address is found not to be within the primary window, then step 86 is performed. At step 86, the secondary window is checked to determine if the external address is within the secondary window. If the secondary window includes the entry for the external address, then step 89 is performed. If, at step 86, it is determined that the secondary window does not contain the external address, then step 88 is executed at which the secondary window is updated with new address mapping information. The secondary window is updated at step 88 using the memory window updating process described above in connection with FIG. 6. The process then goes to step 89.

At step 89, the secondary window is promoted and becomes the primary window. The primary window is demoted and becomes the secondary window. The process then returns to step 85 to find out whether the new primary window includes the external address.

As can be seen from FIG. 5, the memory window update operation of FIG. 6 is only invoked when both the primary window and the secondary window do not contain the external address. By doing so, the memory window update operation is minimized during the access to flash memory card 10. This therefore increases the speed of accessing flash memory card 10 via IC card interface controller 29. In addition, the performance of flash memory card software 68 (FIG. 4) with respect to accessing flash memory card 10 is also improved.

For alternative embodiments, the above-described process of FIG. 5 can also work with more than two memory windows. In this case, the process will check all the windows to find out whether one of the windows contains the external address. If not, the last window is updated with new address mapping information.

Figure 7:
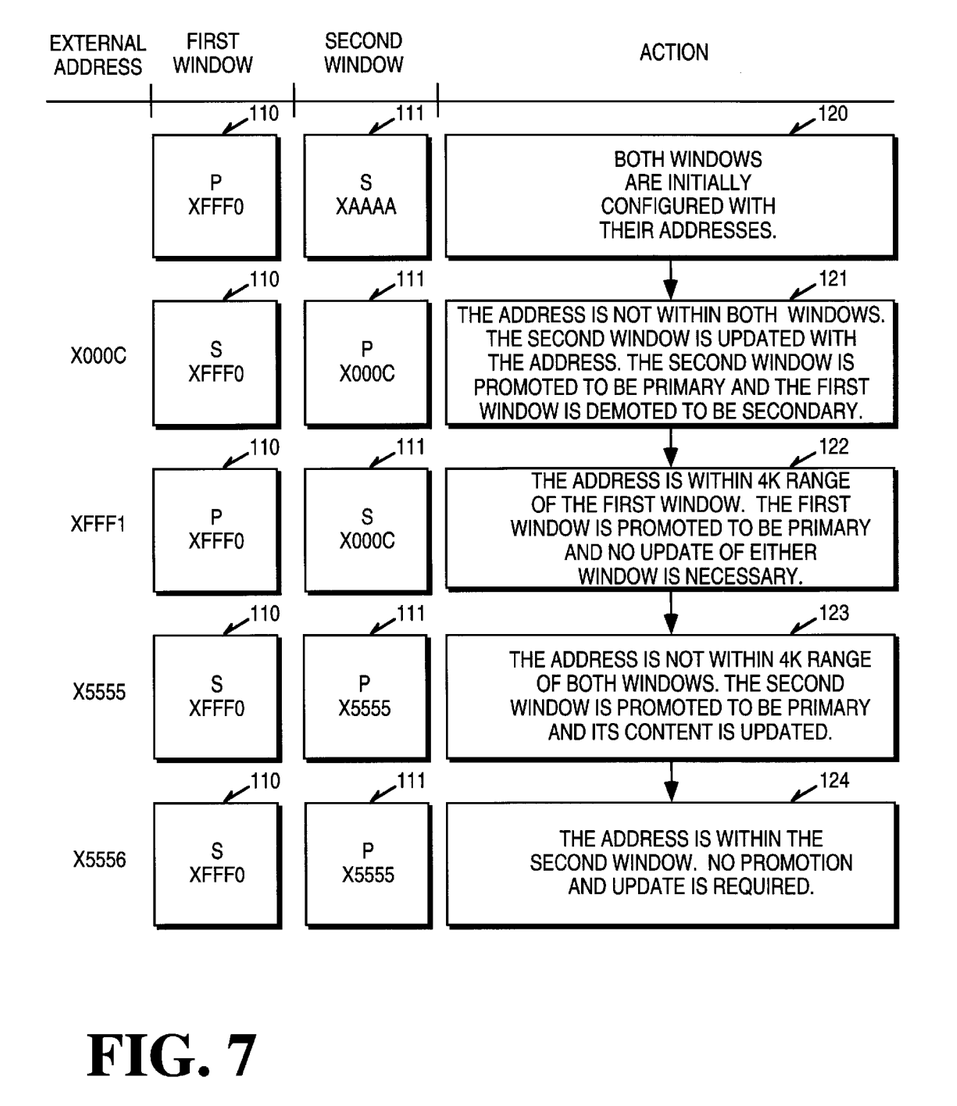
FIG. 7 illustrates examples of the first and second memory mapping windows during execution of the processes of FIGS. 5–6.

FIG. 7 illustrates a first window 110 and a second window 111 of IC card interface controller 29 (FIG. 4) during execution of the process of FIG. 5 in accordance with an embodiment of the present invention. As can be seen from FIG. 7, both windows 110 and 111 are initially configured with their window addresses (see action step 120). First window 110 is set to be the primary and second window 111 is set to be the secondary. For illustration, each window is shown with a midway address to indigate the address range of the respective window.

When an address "X000C" (X indicates the "Do Note Care" portion of the address) is received, first window 110 is first accessed as it is the primary window at this time. When it is found that the "X000C" address is not within window 110, second window 111, which is currently the secondary window, is then accessed. As can be seen from FIG. 7, the "X000C" address is not within either window 110 or window 111. Second window 111 is first updated with new address mapping information that contains the "X000C" address. Second window 111 is then promoted, becoming the primary window. First window 110 is then demoted, becoming the secondary window (see action step 121).

When a new address "XFFF1" is then received, second window 111, which is the current primary window, is first accessed. When it is determined that the address "XFFF1" is not within second window 111, first window 110 (which is currently the secondary window) is then accessed. Because the "XFFF1" address is within first window 110, first window 110 is then promoted and becomes the primary window and second window 111 is then demoted and becomes the secondary window. In this case, however, no memory window update operation is performed (see action step 122).

When a new address "X5555" is then received, first window 110 which is currently the primary window is first accessed. Second window 111 which is currently the secondary window is then accessed as the address "X5555" is not within first window 110. When it is found that the address "X5555" is not within both windows 110 and 111, second window 111 is then updated with new address mapping information that contains the "X5555" address. Second window 111 is then promoted to be the primary window and fist window 110 is demoted (see action step 123).

When a new address "X5556" is received, second window 111 is first accessed. The address is then found within second window 111. In this case, second window 111 remains as the primary and first window remains as the secondary. No update of either windows 110 and 111 is performed (see action step 124).

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In an integrated circuit card controller for controlling memory operations of a nonvolatile memory card, a method of locating a memory address of the memory card that corresponds to an external address, comprising the steps of:
   (A) accessing a first memory address mapping window for the memory address when external circuitry accesses the memory card with the external address, wherein the controller includes the first memory address mapping window and a second memory address mapping window, each storing one of a first set and a second set of memory addresses of the memory card, wherein the first and second set of memory addresses are configured to map the external address directly and through address translation;
   (B) if the first window has the memory address, then accessing the first window for the memory address;
   (C) if the first window does not have the memory address, then
      (i) accessing the second window for the memory address;
      (ii) updating the second window with a third set of memory addresses of the memory card if the second window does not have the memory address;
      (iii) switching the second window with the first window such that the second window becomes the first window and the first window becomes the second window and then returning to the step (A) until the memory address is accessed, wherein updates of the first and second windows are minimized.

2. The method of claim 1, further comprising the step of initializing the first window with the first set of memory addresses of the memory card and the second window with the second set of memory addresses of the memory card.

3. The method of claim 1, further comprising
   (a) determining if there is a new external address accessing the controller for a new memory address of the memory card;
   (b) if there is the new external address accessing the controller for the new memory address, then repeating the steps (A)–(C);
   (c) if there is no new external address accessing the controller for the new memory address, then stop locating a memory address of the memory card.

4. The method of claim 1, wherein both the first and second windows are readily accessible.

5. The method of claim 1, wherein the card controller further includes a third memory address mapping window that stores a fourth set of memory addresses of the memory card, wherein the third window is also readily accessible, wherein the step (C)(ii) further comprises the step of accessing the third window for the memory address if the second window does not have the memory address before updating the second window, wherein the second window is updated if the third window does not have the memory address, wherein the second window is not updated if the third window has the memory address.

6. In a computer system having an integrated circuit card controller coupled to receive a nonvolatile memory card for controlling memory operation of the memory card, a method of locating a memory address of the memory card that corresponds to an external address, comprising the steps of:
   (A) accessing a first memory address mapping window for the memory address when external circuitry accesses the memory card with the external address, wherein the controller includes the first memory address mapping window and a second memory address mapping window, each storing one of a first set and a second set of memory addresses of the memory card, wherein the first and second set of memory addresses are configured to map the external address directly and through address translation;
   (B) if the first window has the memory address, then accessing the first window for the memory address;
   (C) if the first window does not have the memory address, then
      (i) accessing the second window for the memory address;
      (ii) updating the second window with a third set of memory addresses of the memory card if the second window does not have the memory address;
      (iii) switching the second window with the first window such that the second window becomes the first window and the first window becomes the second window and then returning to the step (A) until the memory address is accessed, wherein updates of the first and second windows are minimized.

7. The method of claim 6, further comprising the step of initializing the first window with the first set of memory addresses of the memory card and the second window with the second set of memory addresses of the memory card.

8. The method of claim 6, further comprising
   (a) determining if there is a new external address accessing the controller for a new memory address of the memory card;
   (b) if there is the new external address accessing the controller for the new memory address, then repeating the steps (A)–(C);
   (c) if there is no new external address accessing the controller for the new memory address, then stop locating a memory address of the memory card.

9. The method of claim 6, wherein both the first and second windows are readily accessible.

10. The method of claim 6, wherein the card controller further includes a third memory address mapping window that stores a fourth set of memory addresses of the memory card, wherein the third window is also readily accessible, wherein the step (C)(ii) further comprises the step of accessing the third window for the memory address if the second window does not have the memory address before updating the second window, wherein the second window is updated if the third window does not have the memory address, wherein the second window is not updated if the third window has the memory address.

11. A computer system, comprising:
   (A) a bus;
   (B) a central processing unit coupled to the bus;
   (C) an integrated circuit card controller coupled to the bus for controlling memory operation of a nonvolatile memory card coupled to the controller, wherein the controller further comprises
      (i) a first memory address mapping window configured to store a first set of memory addresses of the memory card;
      (ii) a second memory address mapping window configured to store a second set of memory addresses of the memory card, wherein both the first and second windows are readily accessible and are configured to map the external address directly and through address translation;
      (iii) circuitry configured to locate a memory address of the memory card that corresponds to an external address by accessing the first and second windows, wherein the circuitry for locating accesses the first window for the memory address when external circuitry accesses the memory card with the external address, wherein if the first window does not have the memory address, then the circuitry for locating accesses the second window for the memory address;
      (iv) circuitry configured to update the second window with a third set of memory addresses of the memory card if the second window also does not have the memory address;
      (v) circuitry configured to switch the second window with the first window such that the second window becomes the first window and the first window becomes the second window if the first window does not have the memory address, wherein updates of the first and second windows are minimized.

12. The computer system of claim 11, wherein the memory card is an electrically erasable and programmable memory card.

13. The computer system of claim 11, wherein the controller further comprises circuitry for initializing the first window with the first set of memory addresses of the memory card and the second window with the second set of memory addresses of the memory card.

14. The computer system of claim 11, wherein the controller further includes a third memory address mapping window that stores a fourth set of memory addresses of the memory card, wherein the third window is also readily accessible, wherein the circuitry for locating also accesses the third window for the memory address if the second window does not have the memory address before the circuitry for updating updates the second window, wherein the second window is updated if the third window does not have the memory address, wherein the second window is not updated if the third window has the memory address.

* * * * *

UNITED STATES PATENT AND TRADEMARK OFFICE
CERTIFICATE OF CORRECTION

PATENT NO.   : 5,860,157
DATED        : January 12, 1999
INVENTOR(S)  : Cobb

It is certified that error appears in the above-identified patent and that said Letters Patent is hereby corrected as shown below:

Column 1,
Line 56, delete "16" and insert -- IC --.

Column 7,
Line 30, delete "than" and insert -- then --.

Column 10,
Line 61, delete "indigate" and insert -- indicate --.

Signed and Sealed this

Ninth Day of September, 2003

JAMES E. ROGAN
*Director of the United States Patent and Trademark Office*